3,215,536
COMPOSITIONS FOR PRINTING ON CHEWING GUM

Mario J. Simeone and Louis F. Filosa, Flushing, N.Y., assignors to Warner-Lambert Pharmaceutical Company, Morris Plains, N.J., a corporation of Delaware
No Drawing. Filed Jan. 18, 1965, Ser. No. 426,350
3 Claims. (Cl. 99—135)

The invention of the present application for United States Letters Patent is a continuation-in-part application based on copending application, Serial No. 222,965, filed September 11, 1962, and now abandoned.

This invention relates to novel compositions for printing on chewing gum. More particularly, the present invention relates to new and novel compositions especially adapted for printing on slab chewing gum and including specified amounts of edible synthetic resins and polymers in combination with certain edible plasticizers such as lemon oil and d-limonene.

In the preparation of conventional slab chewing gums, a base is first prepared by heating and blending together the various ingredients which form the base, such as natural gum, synthetic resins, waxes, fillers, and etc. To the completed base is added corn syrup, sugar and one or more flavoring materials. These components are subjected to mild heating, as for example, somewhat above 100° F. in a mixing kettle having mixing blades or agitators which blend the constituents into a homogeneous doughlike mass. The mass is then unloaded from the kettle, cooled, rolled, scored, set and broken into individual slab pieces. A complete batch having a total weight of 100 pounds, generally consists of about 15–30% by weight of gum base, about 10–20% by weight of corn syrup and 50–75% by weight of sugars.

It has been proposed that various printing designs, such as numerals, letters, words, phrases, and the like be imprinted on the surface of the slab gum sticks. For example, in U.S. Pat. No. 3,052,552 Koerner et al. teach a method of printing edible colors on chewing gum traveling at high processing speeds. However, some of the primary problems involved in processing slab chewing gums at high speeds resides in the preparation of suitable printing compositions which will form permanent bonds with the slab gum and which will not become too sticky and adhere to the printing machine, or distribute the printed material poorly over the gum surface, or form a paste which is poorly distributed on the printing machine, or a composition which must be continually circulated to maintain the dye dispersed in the printing composition as taught by Koerner et al.

It is therefore an object of this invention to provide novel printing compositions which are especially suitable for printing on slab chewing gums.

It is another object of this invention to provide printing compositions which may be easily applied with conventional printing equipment and which will form permanent bonds with the slab chewing gum.

It is a further object of this invention to provide a printing composition which does not require special circulating means to maintain the dye dispersed throughout the composition.

These and other objects will be apparent from the following detailed description.

In accordance with this invention, there are provided novel printing compositions which comprise about 35–65% of an edible material selected from the group consisting of natural and synthetic resins and polymers, about 35–65% of edible plasticizers and about 1–15% of Aluminum Lake Colors.

In preparing the novel compositions of the present invention, the plasticizers which are employed form a solution with the natural or synthetic resins or polymers used in the formulation and are those suitable for use as food. These plasticizers found useful according to the practice of the present invention are lemon oil and d-limonene (dipentene).

Among the resins and polymers which may be employed in the formulations of this invention are synthetic resins such as glycerine ester of hydrogenated wood rosin sold by the Hercules Chemical Company under the name Staybelite Ester Gum No. 10; beta-pinenes sold by Penn Industries under the name Piccolyte S-125; Arochem, an ester gum of polymerized rosin; natural resins such as those sold by Interchemical Company under the names RBH Resin No. 510 and RBH Resin No. 529 and polymers such as polyvinyl acetate and polyethylene.

The coloring agents employed in this invention are concentrated Aluminum Lake Colors which are milled to a fine particle size for better distribution of color on the gum. The coloring agents may vary according to the color and shade desired and are commercially produced by dye manufacturers such as the National Aniline Company.

In preparing the printing compositions of this invention, the finely pulverized particles of color are suspended in a liquid vehicle which is prepared by dissolving the resin in the plasticizer with moderate heat.

After the gum has been rolled into sheets according to customary practices, it is passed through a regular printing machine known in the industry as a Harley Proving Press which distributes the composition of this invention smoothly over the surface of the gum. No special dispersing means are required on the printing machine to maintain the dye dispersed in the printing composition. The printing composition after set-up upon the gum base forms a permanent bond with the base. In carrying out the printing operation, various designs including polka dots, numerals, letters, words, phrases, and the like may be imprinted on the surface of the slab chewing gum stick. After imprinting, the gum is cut into normal sized sticks.

It has been found that the range of amounts of the various ingredients employed in the printing compositions of this invention as well as the plasticizers are critical. Tests have shown that if the components are not maintained within the ranges specified, satisfactory results are not obtained. Consequently, satisfactory viscosity, smoothness, drying time and suspension of colors in liquid phase and distribution of color on the gum slab are adversely affected if the ranges for the components of the compositions are not kept within the ranges specified. For example, a composition comprising 75% resins, 20% plasticizer and 5% coloring agents yields a mixture which is sticky and adheres to the roller of the printing machine. A formula consisting of 20% resins, 70% plasticizer and 10% coloring agents yields a mixture which is too thin, with poor body and suspending properties, thus leading to poor color distribution on the gum slab.

The following formulations are illustrative of typical printing compositions of the present invention and numerous variations will be obvious to those skilled in the art.

FORMULATION 1

Cherry red (A) 95 parts of Aluminum Lake Red #4 conc.
5 parts of Aluminum Lake Red #2 conc.
(B) 50 parts of Staybelite Ester Gum No. 10
50 parts of oil of lemon
(C) As a preliminary mix, blend 2 parts of (A) with 3 parts of (B).
(D) Mix 4 parts of blend (C) with 15 parts of (B) yielding a final formula as follows:

|  | Percent |
|---|---|
| Aluminum Lake Colors (total) | 8.4 |
| Staybelite Ester Gum #10 | 45.8 |
| Oil of lemon | 45.8 |
| Total | 100.0 |

FORMULATION 2

Lime (A) 97 parts of Aluminum Lake Yellow #5 conc.
3 parts of Aluminum Lake Green #1 conc.
(B) 60 parts of Piccolyte S-125
40 parts of d-limonene
(C) As a preliminary mix, blend 2 parts of (A) with 3 parts of (B)
(D) Mix 1 part of blend (C) to 7 parts of (B) yielding a final formula as follows:

|  | Percent |
|---|---|
| Aluminum Lake Color (total) | 5.0 |
| Piccolyte S-125 | 57.0 |
| d-Limonene | 38.0 |
| Total | 100.0 |

Having thus provided a written description of the present invention and provided specific examples thereof, it should be understood that no undue restrictions or limitations are to be imposed by reason thereof but that the present invention is defined by the appended claims.

What is claimed is:
1. A composition adapted for printing on slab chewing gum which comprises,
   (A) about 35 to 65% of edible synthetic resins and edible polymers selected from the group consisting of glycerine esters of hydrogenated wood rosin, beta-pinenes, ester gums of polymerized rosins, polyvinyl acetate, and polyethylene;
   (B) about 35 to 65% of a liquid edible plasticizer soluble with said resins and polymers, and selected from the group consisting of lemon oil and d-limonene; and
   (C) about 1 to 15% of Aluminum Lake Coloring agents.
2. A composition particularly adapted for printing on slab chewing gum comprising about 45.8% oil of lemon, about 45.8% of glycerine ester of hydrogenated wood rosin and about 8.4% Aluminum Lake Colors comprising 95 parts of Aluminum Lake Red #4 concentrate and 5 parts of Aluminum Lake Red #2 concentrate.
3. A composition especially adapted for printing on slab chewing gum comprising about 38% d-limonene, about 57% beta-pinenes and about 5% Aluminum Lake Colors comprising 97 parts of Aluminum Lake Yellow #5 concentrate and 3 parts of Aluminum Lake Green #1 concentrate.

References Cited by the Examiner

UNITED STATES PATENTS

| 2,284,804 | 6/42 | De Angelis | 99—135 |
| 2,286,712 | 6/42 | Borglin | 99—135 |
| 2,288,100 | 6/42 | Manson | 99—135 |
| 2,357,811 | 9/44 | Corkery et al. | 99—135 |
| 2,438,551 | 3/48 | Fenimore | 99—135 |
| 2,596,852 | 5/52 | Heggie | 99—135 |
| 3,052,552 | 9/62 | Koerner et al. | 99—135 X |

A. LOUIS MONACELL, *Primary Examiner.*